(12) United States Patent
Ma et al.

(10) Patent No.: US 6,371,373 B1
(45) Date of Patent: Apr. 16, 2002

(54) METHOD FOR READING A TWO-DIMENSIONAL BARCODE

(75) Inventors: Yue Ma, West Windsor; Junichi Kanai, East Windsor, both of NJ (US)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/318,462

(22) Filed: May 25, 1999

(51) Int. Cl.⁷ .................................................. G06K 7/10
(52) U.S. Cl. .............................. 235/462.1; 235/462.01; 235/462.09; 235/462.25; 235/456
(58) Field of Search ........................ 235/462.09, 462.1, 235/462.11, 456, 454, 462.01, 462.07, 462.16, 462.18, 462.19, 462.25, 462.26, 462.27, 462.28

(56) References Cited

U.S. PATENT DOCUMENTS

| | | | | |
|---|---|---|---|---|
| 4,356,389 A | * | 10/1982 | Quirey et al. | 235/455 |
| 4,447,903 A | | 5/1984 | Sewerinson | 371/68 |
| 4,692,603 A | | 9/1987 | Brass et al. | 235/454 |

(List continued on next page.)

FOREIGN PATENT DOCUMENTS

| | | |
|---|---|---|
| EP | 0582911 A2 * | 2/1994 |
| JP | 62-219768 | 9/1987 |
| JP | 62-219769 | 9/1987 |
| JP | 410063771 A * | 3/1998 |

OTHER PUBLICATIONS

Smart Paper—Documents That Both People and Computers Understand.
Smart Paper—Smart Paper Toolkit Technical Overview.
Jain et al., Bar Code Localization Using Texture Analysis, Proceedings of the Second International Conference on Document Analysis and Recognition, Oct., 1993.

Viard–Gaudin et al., A Bar Code Location Algorithm Using a Two–Dimensional Approach, Proceedings of the Second International Conference on Document Analysis and Recognition, Oct., 1993.

Primary Examiner—Michael G. Lee
Assistant Examiner—Jamara A Franklin
(74) Attorney, Agent, or Firm—Amster, Rothstein & Ebenstein (57) ABSTRACT

Two embodiments of a method of decoding information stored in a two-dimensional barcode printed on a printed medium are introduced. Both embodiments provide an improved method of analyzing horizontal and vertical edge count arrays to identify the column and row centerlines therein to enable the subsequent reading of the binary data located at the intersection of each row centerline and column centerline. In the first embodiment, the centerlines are located by first locating each successive pair of peaks in the respective edge count array, where each peak must have a magnitude greater than a first predetermined value, and then locating a centerline in a valley region between each successive pair of peaks, each of the centerlines having a magnitude less than a second predetermined value. Preferably, each successive pair of peaks in the respective edge count array is separated by a third predetermined value. In addition, the first predetermined value is preferably reduced by a predetermined amount if a second peak within a pair of peaks in the respective edge count array is separated from a first peak by more than a fourth predetermined value, and the second peak is then re-identified using the reduced first predetermined value. The second embodiment alternately employs the method of the first embodiment or a prior art method to reduce the number of errors produced, using the prior art method first to locate the column centerlines and the method of the first embodiment first to locate the row centerlines.

16 Claims, 9 Drawing Sheets

U.S. PATENT DOCUMENTS

| | | | |
|---|---|---|---|
| 4,736,109 A | 4/1988 | Dvorzsak | 250/566 |
| 4,750,209 A | 6/1988 | Shimura et al. | 382/9 |
| 4,754,127 A | 6/1988 | Brass et al. | 235/456 |
| 4,782,221 A | 11/1988 | Brass et al. | 235/494 |
| 4,924,078 A | 5/1990 | Sant'Anselmo | 235/494 |
| 4,939,354 A | 7/1990 | Priddy et al. | 235/456 |
| 4,948,955 A | 8/1990 | Lee et al. | 235/462 |
| 4,988,852 A | 1/1991 | Krishnan | 235/462 |
| 5,051,779 A | 9/1991 | Hikawa | 355/200 |
| 5,053,609 A | 10/1991 | Priddy et al. | 235/436 |
| 5,060,980 A | 10/1991 | Johnson et al. | 283/70 |
| 5,065,437 A | 11/1991 | Bloomberg | 382/9 |
| 5,073,954 A | 12/1991 | Van Tyne et al. | 382/18 |
| 5,083,214 A | 1/1992 | Knowles | 358/403 |
| 5,091,966 A | 2/1992 | Bloomberg et al. | 382/21 |
| 5,126,542 A | 6/1992 | Priddy et al. | 235/456 |
| 5,128,525 A | 7/1992 | Stearns et al. | 235/454 |
| 5,168,147 A | 12/1992 | Bloomberg | 235/456 |
| 5,189,292 A | 2/1993 | Batterman | 235/494 |
| 5,221,833 A | 6/1993 | Hecht | 235/494 |
| 5,241,166 A | 8/1993 | Chandler | 235/494 |
| 5,245,165 A | 9/1993 | Zhang | 235/454 |
| 5,262,623 A | 11/1993 | Batterman et al. | 235/454 |
| 5,296,690 A | 3/1994 | Chandler et al. | 235/462 |
| 5,304,787 A | 4/1994 | Wang | 235/462 |
| 5,324,923 A | 6/1994 | Cymbalski et al. | 235/454 |
| 5,337,362 A | 8/1994 | Gormish et al. | 380/54 |
| 5,343,031 A | 8/1994 | Yoshida | 235/494 |
| 5,352,878 A | 10/1994 | Smith et al. | 235/462 |
| 5,378,881 A | 1/1995 | Adachi | 235/462 |
| 5,404,003 A | 4/1995 | Smith | 235/462 |
| 5,477,037 A | 12/1995 | Berger | 235/379 |
| 5,487,115 A | 1/1996 | Surka | 382/296 |
| 5,616,905 A | 4/1997 | Sugiyama | 235/456 |
| 5,734,152 A * | 3/1998 | Goren et al. | 235/462.27 |
| 5,790,715 A | 8/1998 | Iizuka | 382/309 |
| 5,801,848 A | 9/1998 | Kafri | 358/470 |
| 6,055,007 A * | 4/2000 | Fujiwara et al. | 347/131 |
| 6,082,619 A * | 7/2000 | Ma et al. | 235/462.1 |
| 6,115,508 A * | 9/2000 | Lopresti et al. | 382/306 |

\* cited by examiner

METHOD FOR READING A TWO-DIMENSIONAL BARCODE

FIELD OF THE INVENTION

The invention relates generally to an improved method for reading two-dimensional barcodes printed within an image. In particular, the method of reading two-dimensional barcodes of the present invention provides improved performance when reading documents which have been previously transmitted by facsimile, or which contain noise similar to that caused by facsimile machines.

BACKGROUND OF THE INVENTION

A common technique for reading raw bits (i.e., logical bits representing either a "1" or a "0") in a one-dimensional barcode is to move a horizontal scan line across the barcode and detect transitions from white to black and from black to white. However, this technique cannot be directly applied to a two-dimensional barcode which consists of an array of N rows and M columns of logical bits, because a single scan line can not determine which of the N rows or which of the M columns it is reading.

Various techniques have been used to read the logical bits from a two-dimensional barcode which involve the addition of alignment marks and/or clock bits that are used to specifically identify the separate rows and columns.

A method of reading a two-dimensional barcode which does not require clock bits or alignment marks to identify rows or columns of logical bits is described in U.S. Pat. No. 5,862,270 ("the '270 Patent"), entitled "A Clock-Free Two-Dimensional Barcode and Method for Printing and Reading the Same" and assigned to the same assignee as the present invention. The contents of the '270 Patent are explicitly incorporated by reference herein. As described in further detail in the '270 Patent, the method for reading the logical bits within a two-dimensional barcode described therein operates on the bit array resulting from the scanning process. All of the horizontal "edges" for each column of the pixel array, and all of the vertical "edges" for each row are identified and then counted, and then horizontal and vertical histograms (actually one-dimensional arrays) are created of the edge count for each column and row, respectively. Each array is then examined to determine the local minimas, which represent the center lines for each column and row, since there are much fewer edges in the center of a column or row than at the periphery. Since the system has a priori knowledge of how many logical bits are in a column and in a row (and thus how far apart the column and row centerlines should be), the processing of these one-dimensional arrays is improved by only looking within particular regions for the local minimas.

However, the method of the '270 Patent may encounter difficulties in reading a two-dimensional barcode which has been transmitted by facsimile, due to distortion of the barcode caused by horizontal line drop and horizontal line repeat during the facsimile transmission of the document, or a two-dimensional barcode which contains drawn line noise in either the horizontal or vertical directions. A horizontal line drop, when it occurs at the point on the document being transmitted where the barcode is positioned, causes the height of a row of logical bits to be smaller than the height of the rest of the rows within the two-dimensional barcode. Of course, as one reasonably skilled in the art will recognize, if the horizontal line drop is so large that an entire row of logical bits is deleted, no amount of processing can read the deleted logical bits, although, as discussed in the '270 Patent, error correction techniques may be used to recover the lost data. On the other hand, a horizontal line repeat, when it occurs at the point on the document being transmitted where the barcode is positioned, causes the height of one row of logical bits to be larger than the height of the rest of the rows and the height of another row of logical bits to be smaller than the height of the rest of the rows within the two-dimensional barcode. Drawn line noise is caused by actual marking of the document by, e.g., a pencil, and can cause a single row or column of logical bits to appear as two separate rows or columns of logical bits having a height or width, respectively, smaller than the rest of the rows or columns.

Figure 1:
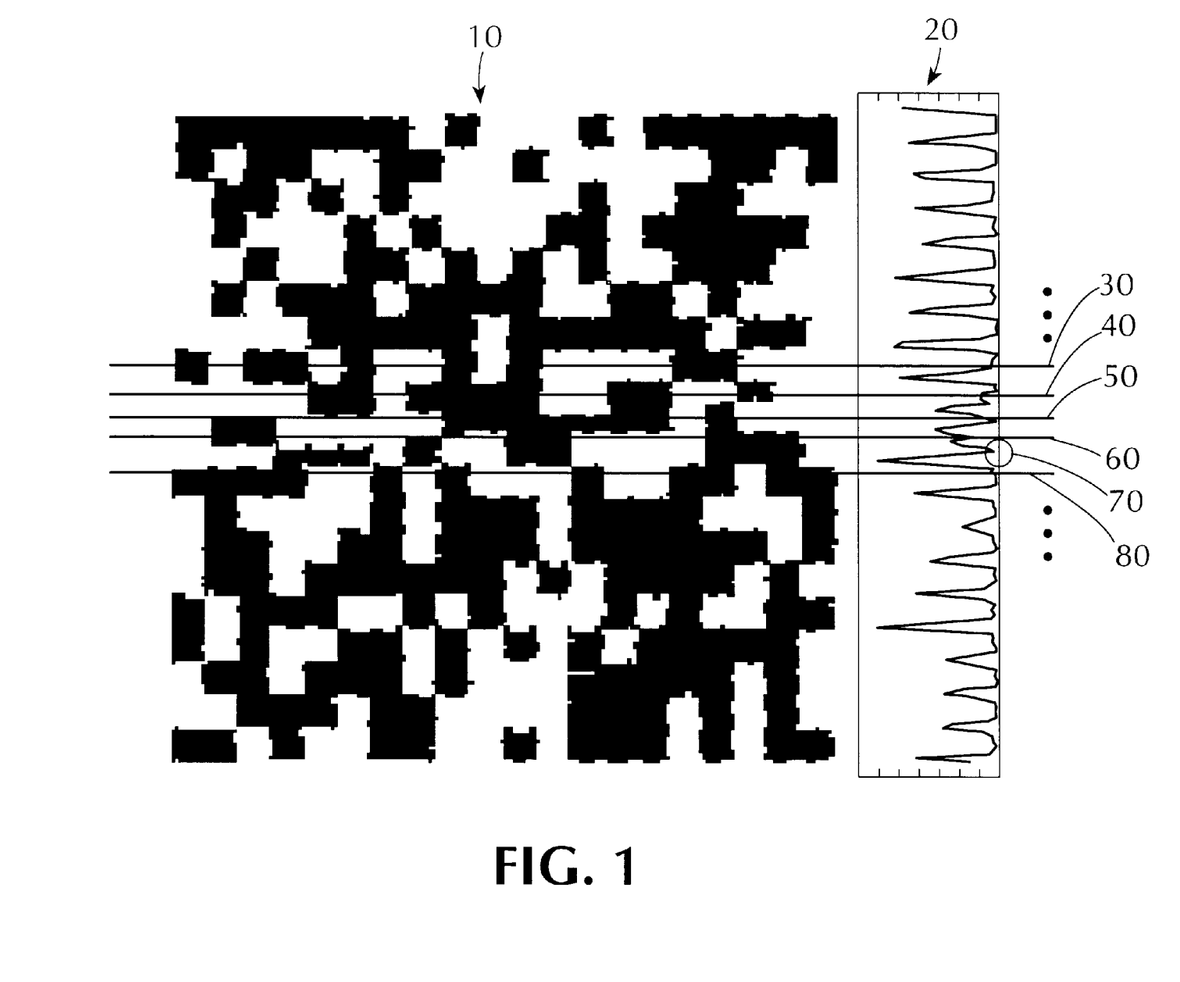
FIG. 1 shows a two-dimensional barcode having line drop distortion, and the resulting histogram of vertical edges and calculated centerlines for that barcode.

The method of '270 Patent may miss a row centerline, add a row centerline, or both, due to line repeat or line drop distortion, since both types of distortion cause the center line for the row distorted to have an unanticipated row to row spacing. In FIG. 1, a barcode 10 which has suffered a line drop of four lines is shown alongside the resulting vertical edge histogram 20 (histograms are used herein to graphically display the horizontal (or column) and vertical (or row) edge count arrays which are processed to locate the column and row centerlines, respectively). The row centerlines 30 through 60 and 80 have been determined by the method of the '270 Patent. While row centerlines 30, 40, 50 and 80 have been correctly determined, centerline 60 was incorrectly determined due to the extra local minima caused by the line drop and is thus too close to centerline 50. In addition, local minima 70, representing the proper centerline for that row, was missed since it was not within the region examined for a local minima.

It is therefore an object of the present invention to provide an improved method of reading a clock free two-dimensional barcode printed on a printed medium.

It is an additional object of this invention to provide a method of reading a clock free two-dimensional barcode which includes distortion caused by the transmission by facsimile of the document on which the barcode is printed.

It is yet another object of this invention to provide a method of reading a clock free two-dimensional barcode which includes distortion caused by lines drawn on the face of the document on which the barcode is printed.

Various other objects, advantages and features of the present invention will become readily apparent from the ensuing detailed description and the novel features will be particularly pointed out in the appended claims.

SUMMARY

The present invention is directed to a method of decoding information stored in a two-dimensional barcode printed on a printed medium which provides improved performance when the barcode to be read includes line drop or line repeat distortion caused by transmission by facsimile. Two embodiments of the present invention are disclosed. In both embodiments, the two-dimensional barcode is first scanned to create a two-dimensional pixel array representing the two-dimensional barcode. Then the number of horizontal edges in each column of pixels in the two-dimensional pixel array are determined and stored in an horizontal edge count array, and, likewise, the number of vertical edges in each row of pixels in the two-dimensional pixel array are determined and stored in a vertical edge count array. Each array is then processed to locate the centerlines therein, where the intersection of each column and row centerline represents the position of a binary bit of data stored in the two-dimensional barcode. The centerlines are then used to extract the binary data from the scanned two-dimensional barcode, to produce a signal representative of the encoded information stored therein.

In the first embodiment, the horizontal and vertical edge count arrays are processed in the same manner to extract the column and row centerlines, respectively. In particular, each of the two edge count arrays is separately scanned to determine the centerlines therein by locating each successive pair of peaks in the edge counts, each of the peaks having a magnitude greater than a first predetermined value, and then locating a centerline in a valley region between each successive pair of peaks, each of the centerlines having a magnitude less than a second predetermined value. Once both edge count arrays have been processed, the binary data located at the intersection of each row centerline and column centerline is read to produce a signal representative of the encoded information in the two-dimensional barcode. Preferably, each of the successive pair of peaks in the edge count array must be separated by a third predetermined value. In addition, the first predetermined value is preferably reduced by a predetermined amount if a second peak within a pair of peaks in the edge count array is separated from a first peak by more than a fourth predetermined value, and the second peak is then reidentified using the reduced first predetermined value.

In the second embodiment, the horizontal and vertical edge arrays are processed differently to extract the centerlines therein, to reduce the number of total errors encountered when using the method of the first embodiment. Since it is more likely that line drop or line repeat distortion will affect the row centerline spacing than the column centerline spacing, the horizontal edge array is first processed using the prior art method (i.e., the method disclosed in the '270 Patent), in which the local minima representing the column centerlines in the horizontal edge counts are located. If the number of column centerlines located conforms to the expected value, processing proceeds to the vertical edge array. However, if the number of column centerlines located is not equal to the expected value, the column centerlines are alternately determined using the method of the first embodiment, in which each successive pair of peaks in the horizontal edge counts is located, each of the peaks having a magnitude greater than a first predetermined value, and then locating a column centerline in a valley region between each successive pair of peaks, each of the column centerlines having a magnitude less than a second predetermined value. The vertical edge count array is processed differently, first employing the method of the first embodiment in which the row centerlines are determined by locating each successive pair of peaks in the vertical edge counts, each of the peaks having a magnitude greater than the first predetermined value, and then locating a row centerline in a valley region between each successive pair of peaks, each of the row centerlines having a magnitude less than a second predetermined value. If the number of row centerlines located thereby conforms to the expected value, processing is complete and the encoded information can be read from the scanned barcode. However, if the number of row centerlines located is one greater than the expected value, the extra centerline is located and deleted. Also, if the number of row centerlines located is one less than the expected value, the missing centerline is located and inserted. In addition, if the number of row centerlines is more than one greater than the expected value or more than one less than the expected value, the row centerlines are alternately located by locating the local minima representing the row centerlines in the vertical edge counts. Once the column and row centerlines have been correctly determined, the binary data located at the intersection of each row centerline and column centerline is read to produce a signal representative of the encoded information in the two-dimensional barcode.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

The present invention is an improvement to the method of reading a two-dimensional barcode of the '270 Patent, and provides improved results when reading two-dimensional barcodes which include distortion caused by the transmission of the document on which the barcode is printed. Two preferred embodiments of the present invention are disclosed. In both embodiments, one-dimensional arrays representing vertical and horizontal histograms of the row edge counts and column edge counts are first generated in the same manner as fully described in the '270 Patent. The first embodiment separately analyzes the edge counts in the horizontal and vertical arrays to locate the column and row centerlines, respectively, for the logical bits and provides greatly improved performance when encountering line drop or line repeat distortion. However, it can produce an increased number of total errors as compared to the method of the '270 Patent. Thus, the second embodiment selectively uses the method of the first embodiment or the method of the '270 Patent and provides improved performance with respect to both line drop or line repeat distortion and total errors as compared to the first embodiment of the invention.

As discussed in greater detail above, the method of the '270 Patent determines the local minima in regions where the centerlines are expected to occur to find the row and column centerlines in the vertical and horizontal edge histograms, respectively. Errors may result when using the method of the '270 Patent if the two-dimensional barcode includes line drop or line repeat distortion, because the centerlines are then located outside the expected region. To eliminate those errors, a different method for analyzing the vertical and horizontal edge histogram arrays which sequentially scans each array to identify each of the peaks in the edge array is implemented. During this scanning process, the valley between each consecutive pair of the peaks is examined to locate the centerlines therebetween.

Figure 2:
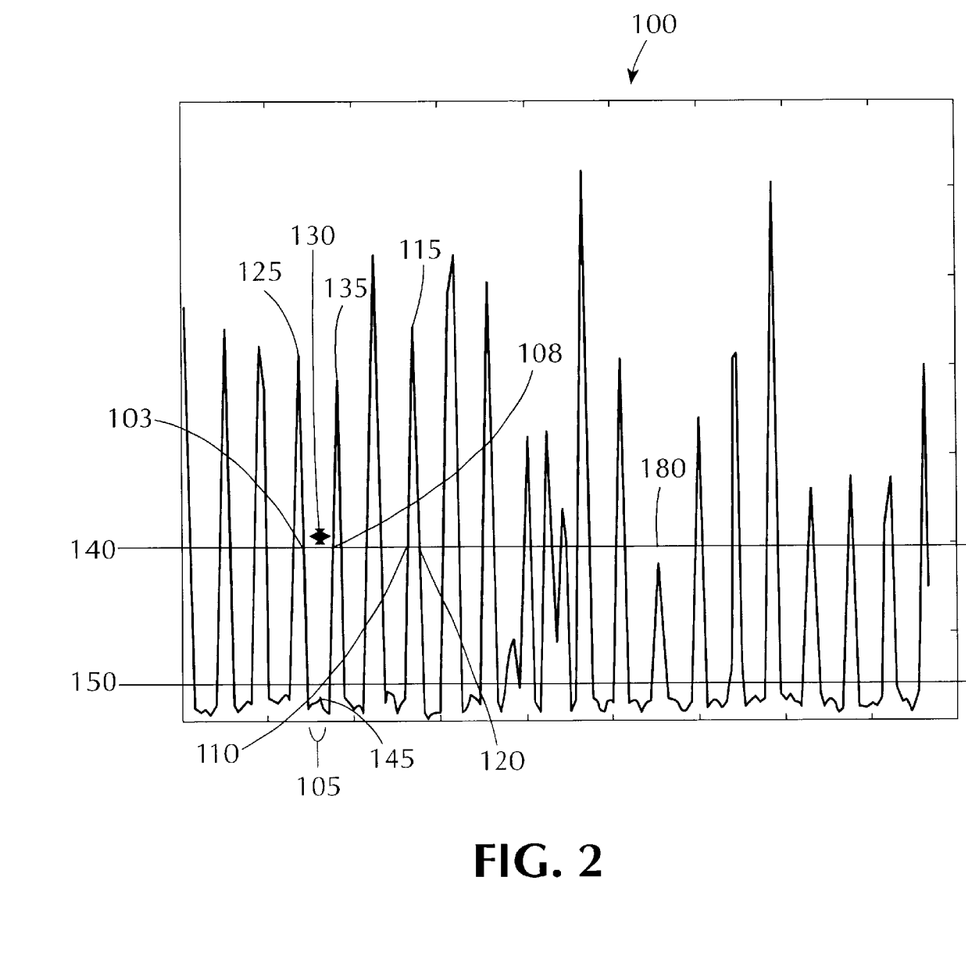
FIG. 2 is a vertical edge histogram of a two-dimensional barcode which depicts certain elements used in a first embodiment of the present invention, including the zero crossing transition, the minimum peak gap and the maximum valley threshold.

Referring now to FIG. 2, a histogram 100 is shown which represents an edge array (either horizontal or vertical) which is to be processed to locate the centerlines therein. In the method of the first embodiment, peaks (e.g., peak 115) generally have a value greater than an initial minimum peak value 140 and are preferably located by identifying the points at which the array value transitions across the initial minimum peak value 140, although as one reasonably skilled in the art will readily realize, various other methods may be used to locate the peaks within edge arrays. In particular, peak 115 is preferably identified by locating up crossing point 110 (i.e., the local point where the array transitions from a value less than initial minimum peak value 140 to a value greater than initial minimum peak value 140) and down crossing point 120 (i.e., the local point where the array transitions from a value than greater initial minimum peak value 140 to a value less than initial minimum peak value 140) while scanning along the array represented by histogram 100.

To prevent ripple noise from causing the false identification of a peak, the method of the first embodiment preferably requires that the gap between each consecutive pair of peaks (e.g., peaks 125 and 135) be separated by a predetermined minimum gap 130 (P_min). This gap is calculated as the distance between the down crossing point of a first peak (e.g., point 103 of peak 125) and the up crossing point of a second peak (e.g., point 108 of peak 135), and is set to a value which ensures that noise in the edge array does not cause the incorrect identification of a peak within the edge array.

To identify the local centerline between each consecutive pair of peaks, the method of the first embodiment preferably requires that there be at least one pixel (e.g., pixel 145) in a valley region (e.g., region 105) between the identified pair of peaks (e.g., peaks 125 and 135) which has a value less than a predetermined maximum threshold value 150, although as one reasonably skilled in the art will readily realize, various other methods may be used to locate the centerlines between each identified pair of peaks. A valley region (e.g., region 105) is defined as a window of preferably 3 pixels which is identified by locating the center pixel thereof, defined as the midpoint between the down crossing point from the first peak (e.g., point 103) and the up crossing from the next peak (e.g, point 108). The pixel identifying the centerline is the pixel within the valid valley region having the lowest value (a valid valley region is one having at least one pixel with a value less than the maximum threshold value 150). The use of a window for the valley region eliminates some of the spike noise which may be present in the array. For example, if a narrow spike occurs in the midpoint pixel between two peaks, the value at this midpoint pixel may exceed the maximum valley threshold. By also examining one pixel to the left and right of the midpoint pixel, a pixel having a value lower than the threshold 150 may still be found and the local centerline can still be detected. As one reasonably skilled in the art will realize, the number of pixels within the window defining the valley region may be increased to further improve performance in light of spike noise, however this will result in an increase of processing time.

In the above manner, most of the peaks within the histogram 100 can be identified. However, because the logic bits of a two-dimensional barcode are randomized before they are generated, there is no fixed pattern to the logic bits and the patterns within the horizontal and vertical edge arrays vary from one barcode to another. The height of the peaks within the arrays also vary significantly from one barcode to another. The initial peak threshold value 140 is obtained using an empirical process which ensures that it is set at a height which is low enough to allow for the detection of the majority of peaks, but not too low that it detects false peaks caused by noise. However, in some cases a true peak (e.g., peak 180) may fall below the initial peak threshold 140.

Figure 3:
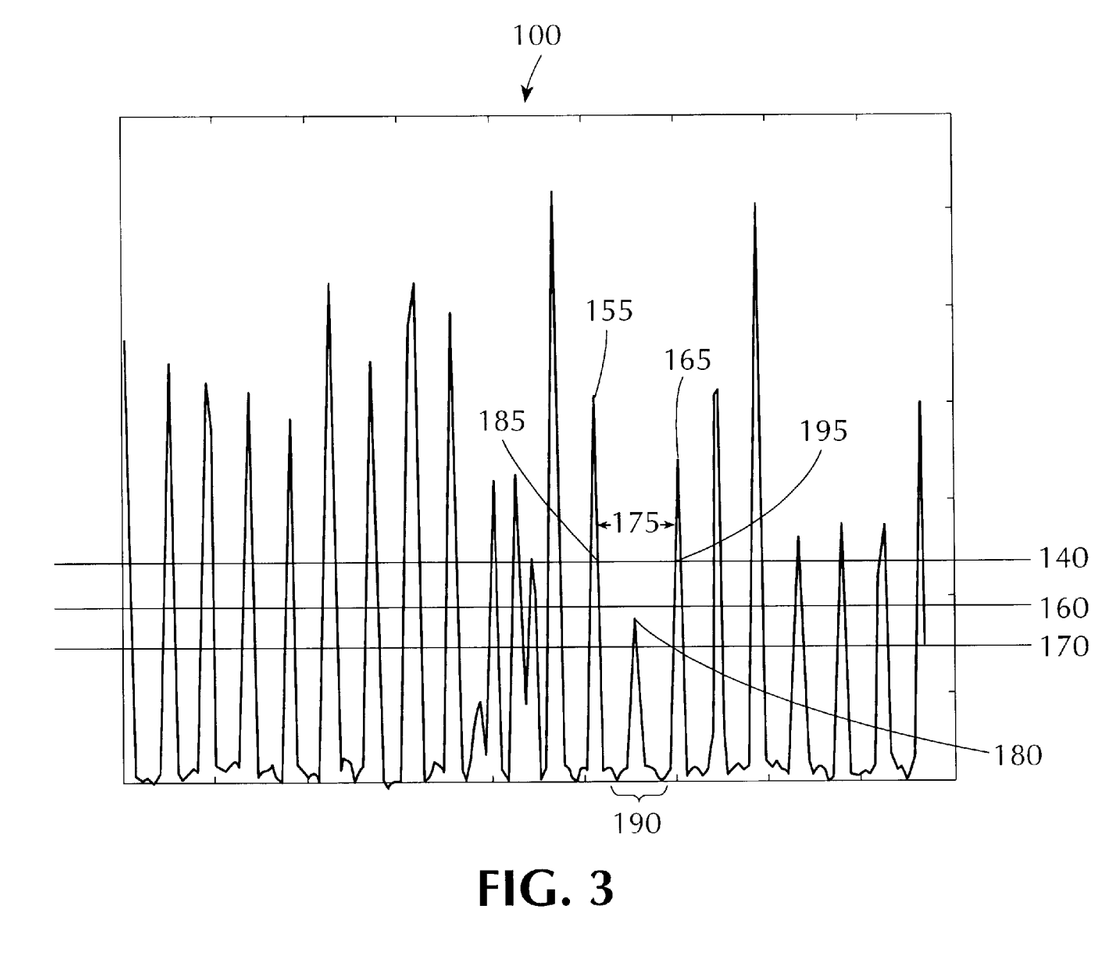
FIG. 3 is a vertical edge histogram of a two-dimensional barcode which depicts how the adaptive process of the first embodiment operates.

Referring now to the histogram 100 of FIG. 3, when a peak such as peak 180 is not identified, the distance 175 between the down crossing point 185 of the first peak 155 and the up crossing point 195 of the second peak 165 will be greater than a predetermined maximum value representing the normal peak gap. To identify the missed peak, when the distance between two consecutive peaks (calculated as the distance between the down crossing point of a first peak and the up crossing point of a second peak) is found to be greater than this predetermined maximum value, an adaptive process is utilized in the method of the first embodiment to further examine an adaptive region (i.e., the region between the down crossing point of the first peak and the up crossing point of the second peak) using a new threshold value 160 that is smaller than the initial threshold value 140, preferably 20% less. When examining an adaptive region (e.g., region 190) if the second peak (e.g., peak 165) is again too far from the initial peak (e.g., peak 155), a further reduced threshold value 170 is used, which is preferably 20% less than threshold 160. Preferably, at most two passes are attempted within the same adaptive region before determining that an error condition exists, and that the two-dimensional barcode must be rejected as unreadable. This adaptive process allows a very low peak (e.g., peak 180) to be detected. As one reasonably skilled in the art will realize, the amount that the threshold is reduced per pass and the maximum number of passes are design choices which involve a tradeoff between accuracy and processing time and may be chosen to optimize either accuracy or processing time, with a resulting reduction in the other. The peak threshold is reset to its initial value 140 and the normal detection process continues once a missed peak is successfully detected within an identified adaptive region. When processing continues after finding a valid peak, the first peak is then set to be the found valid peak, which ensures that two or more consecutive peaks which have values less than the initial peak threshold 140 may be located.

The number of centerlines in each histogram is preferably predefined, which allows a validation step to be performed during processing of the array. The two-dimensional barcode of the '270 Patent preferably consisted of a 20×20 bit array, and therefore when reading that barcode if the total number of centerlines found in each array is not equal to 20, an error condition exists, and the two-dimensional barcode must be rejected as unreadable.

Figure 4:
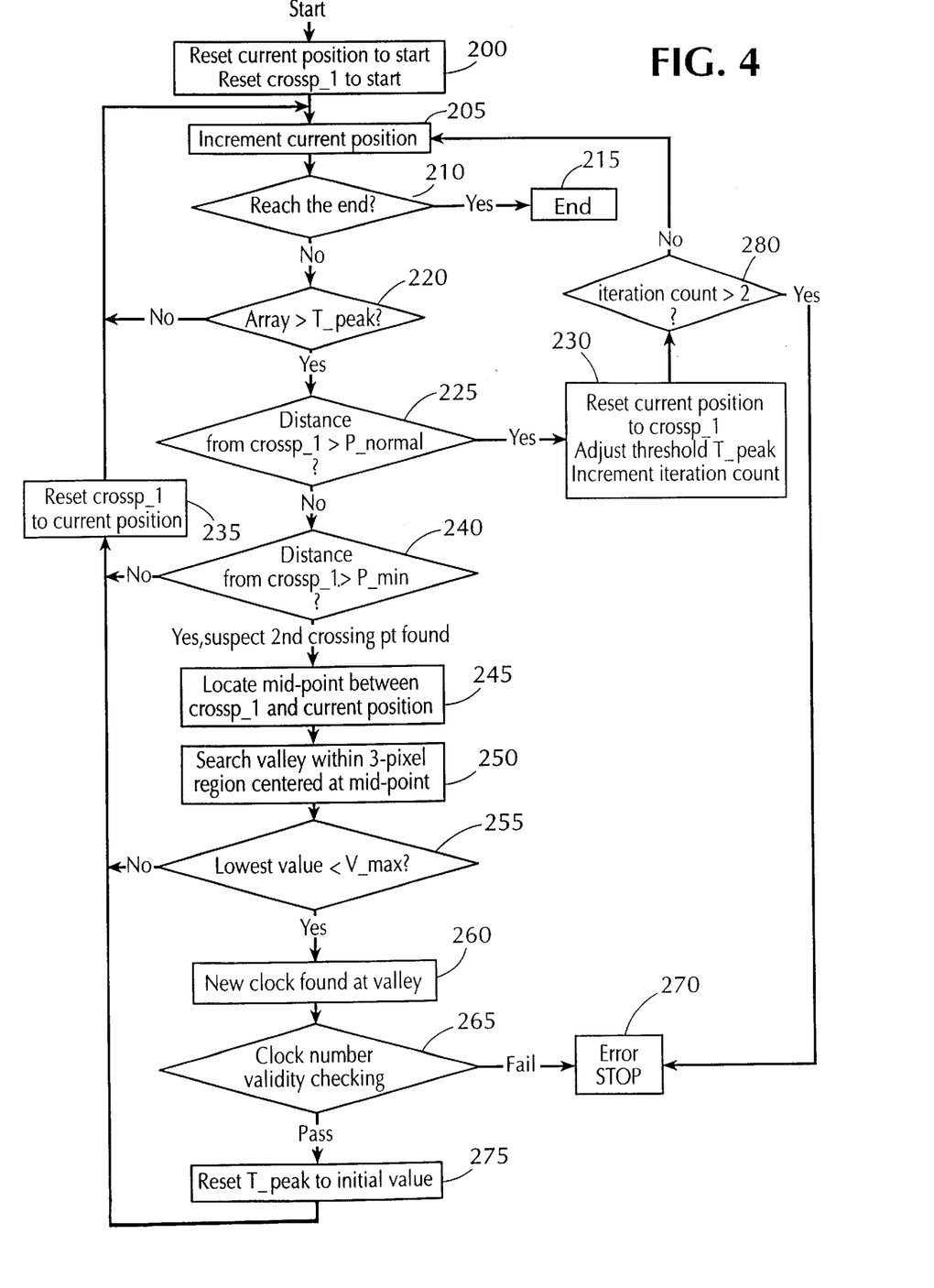
FIG. 4 is a flowchart describing the operation of the first embodiment of the present invention.

Referring now to FIG. 4, the centerline detection method of the first embodiment is preferably implemented in a fast scan-once procedure that integrates all of the processing described above. The only time that a region within the array is rescanned is when adaptive thresholding is used to detect low peaks. In particular, processing starts at step 200, where the current position index is set to the first point in the array being examined, and the first crossing point (i.e., crossp_1) is also set to the first point in the array. At step 205, the current position index is incremented, and at step 210 the current position index is checked to see if the end of the array has been reached. If it has, processing ends at step 215. If processing is not complete, the value of the array at the current position is compared at step 220 to the current T_peak value (which is initially set to the initial minimum peak value 140 shown in FIGS. 2 and 3). If the value of the array at this point is less than or equal to the current T_peak value, processing returns to step 205 where the current position index is incremented again. If the value of the array at this point is greater than the current T_peak value, processing moves to step 225, where the distance between the current position index and the first crossing point is compared to the P_normal value, which represents the predetermined normal gap 130 discussed above with respect to FIG. 2.

If the distance between the current position index and the first crossing point is greater than the P_normal value, adaptive thresholding is begun at step 230, where the current position is reset to crossp_1 and the T_peak value is reduced by a preset proportion, preferably by 20% as discussed above. Thereafter, the processing reverts to step 205 for examination of the previously scanned section, but using the smaller T_peak value. Step 230 also tracks the number of adaptive thresholding iterations that occur, i.e., the number of times that T_peak is reduced, and if it is found at step 280 that this exceeds a predetermined limit, preferably two as discussed above with respect to FIG. 3, a failure is deemed to have occurred and processing stops at step 270.

If the distance between the current position index and the first crossing point is less than or equal to the P_normal value, processing moves to step 240, where the distance between the current position index and the first crossing point is compared to the minimum predetermined gap (i.e., P_min), as discussed above with respect to FIG. 2.

If the distance between the current position index and the first crossing point is less than or equal to the P_min value at step 240, the second peak has not been found and the first crossing point, crossp_1, is reset to the current index position at step 235, and processing returns to step 205 to continue looking for the second peak.

If the distance between the current position index and the first crossing point is greater than the P_min value at step 240, the second peak is suspected to have been found. As discussed with respect to FIG. 2, the second crossing point is an up crossing point, such as point 108 in FIG. 2. The midpoint between the first crossing point, crossp_1, and the current index position is identified at step 245, the current index point here representing the suspected second crossing point. At step 250, a valley region comprising the array value at the midpoint and the array values at the points having an index one greater and one fewer than the midpoint are identified, and the index of the lowest of those three values is selected as a potential centerline. The value at the potential centerline is compared to the predetermined maximum threshold value, V_max (discussed with respect to FIG. 2 above), at step 255.

If the value at the potential centerline is less than V_max at step 255, a valid centerline has been found and the index thereof is stored at step 260. At step 265, the total number of centerlines found is compared to a predetermined number, preferably 20. If the number of centerlines has exceeded this predetermined number, an error has been encountered, at step 270 processing stops and an error signal is provided to the host. If the number of centerlines is less than or equal to the predetermined number of centerlines, processing continues at step 275, where T_peak is reset to the initial value, and then at step 235, where the current index position is set to crossp_1, and then to step 205, where the search for the next centerline starts, as discussed above.

If the value at the potential centerline is greater than or equal to V_max at step 255, then a valid centerline has not been found, the current index position is set to crossp_1 at step 235, and processing continues to step 205, where the search for the next valid centerline continues, as discussed above. This process continues until the end of the array is reached, or an error condition is encountered.

The method of the first embodiment has been found to provide improved performance over the method of the '270 Patent when used to read barcodes having line drop distortion affecting four consecutive lines. However, it was discovered that when barcodes having line repeat distortion affecting four consecutive lines, or line drop or line repeat distortion affecting two consecutive lines were read using the method of the first embodiment, the total number of barcodes rejected increased when compared to the method of the '270 Patent.

Because of the increased errors encountered using the method of the first embodiment, a second method was developed which alternately uses the method of the '270 Patent or the method of the first embodiment, depending on the circumstances. In this manner, a method which provides the improved performance over the method of the first embodiment when reading barcodes having line drop and/or line repeat distortion and also provides the low error rate of the method of the '270 Patent is achieved. In particular, this method takes advantage of the fact that line drop and/or line repeat distortion usually occurs while moving in a vertical direction and applies different steps to the horizontal and vertical edge arrays. In addition, the method of the second embodiment provides the ability to insert or delete centerlines, preferably one, when the number of centerlines is found to be less than expected or greater than expected, respectively.

Figure 5:
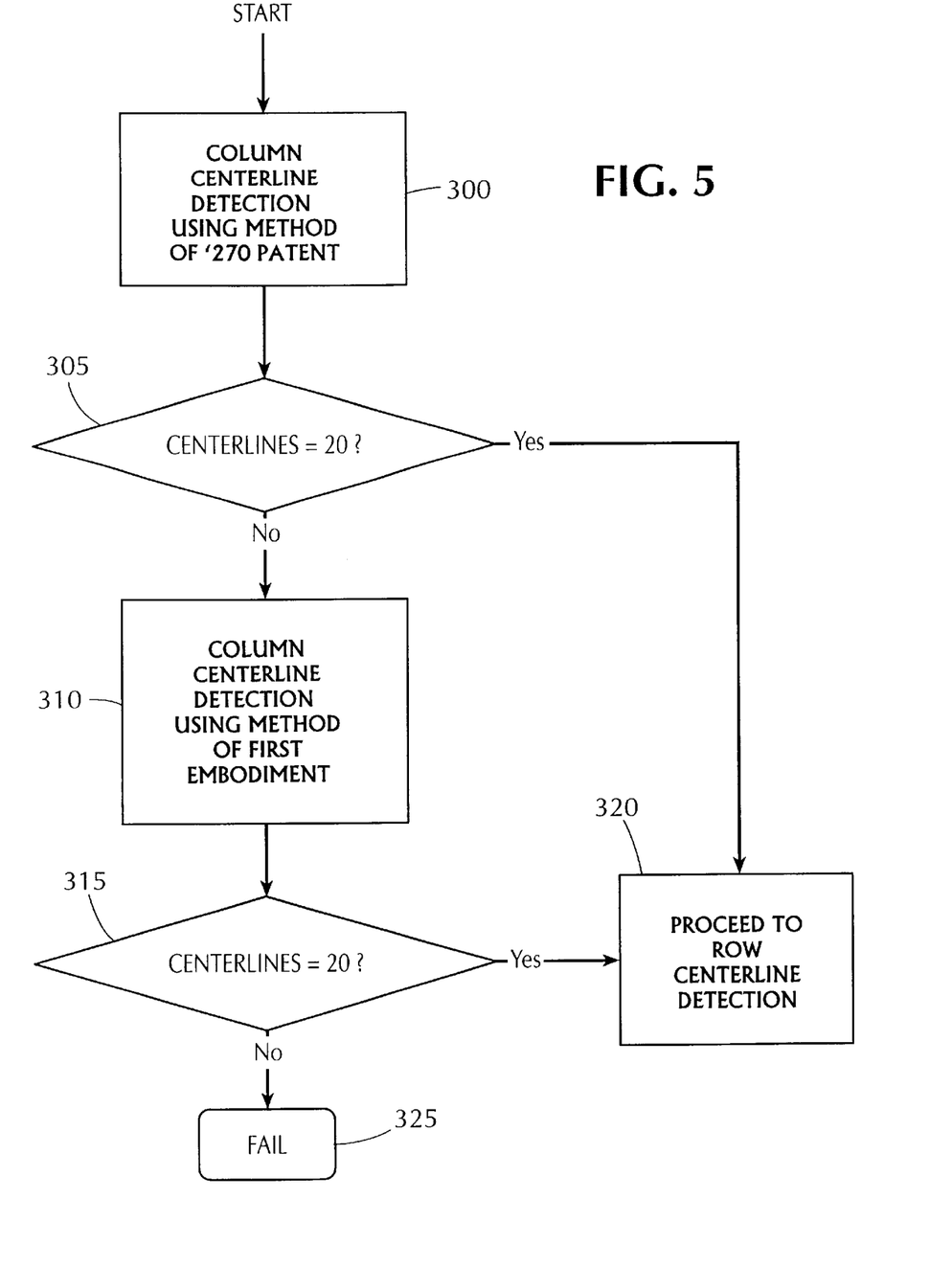
FIG. 5 is a flowchart showing how column centerlines are calculated in the second embodiment of the present invention.

Referring now to the flowchart of FIG. 5, since it is not likely that any line drop or line repeat distortion will affect the columns of the two-dimensional barcode, the method of the second embodiment first applies the method of the '270 Patent at step 300 to the horizontal edge array. If step 305 determines that the correct number of column centerlines in the horizontal edge array were detected in step 300, processing moves to the detection of the row centerlines in the vertical edge array (step 320), which is described in conjunction with FIG. 6 below. If the correct number of column centerlines in the horizontal edge array was not detected in step 300, the horizontal edge array is reprocessed using the method of the first embodiment at step 310. If the method of the first embodiment is found to have produced no errors at step 315 (signified by locating the proper number of column centerlines, which in the preferred embodiment is 20), processing moves to the detection of the row centerlines in the vertical edge array (step 320). If the method of the first embodiment produces an incorrect number of centerlines, a failure is noted and processing stops, as designated by step 325.

Figure 6:
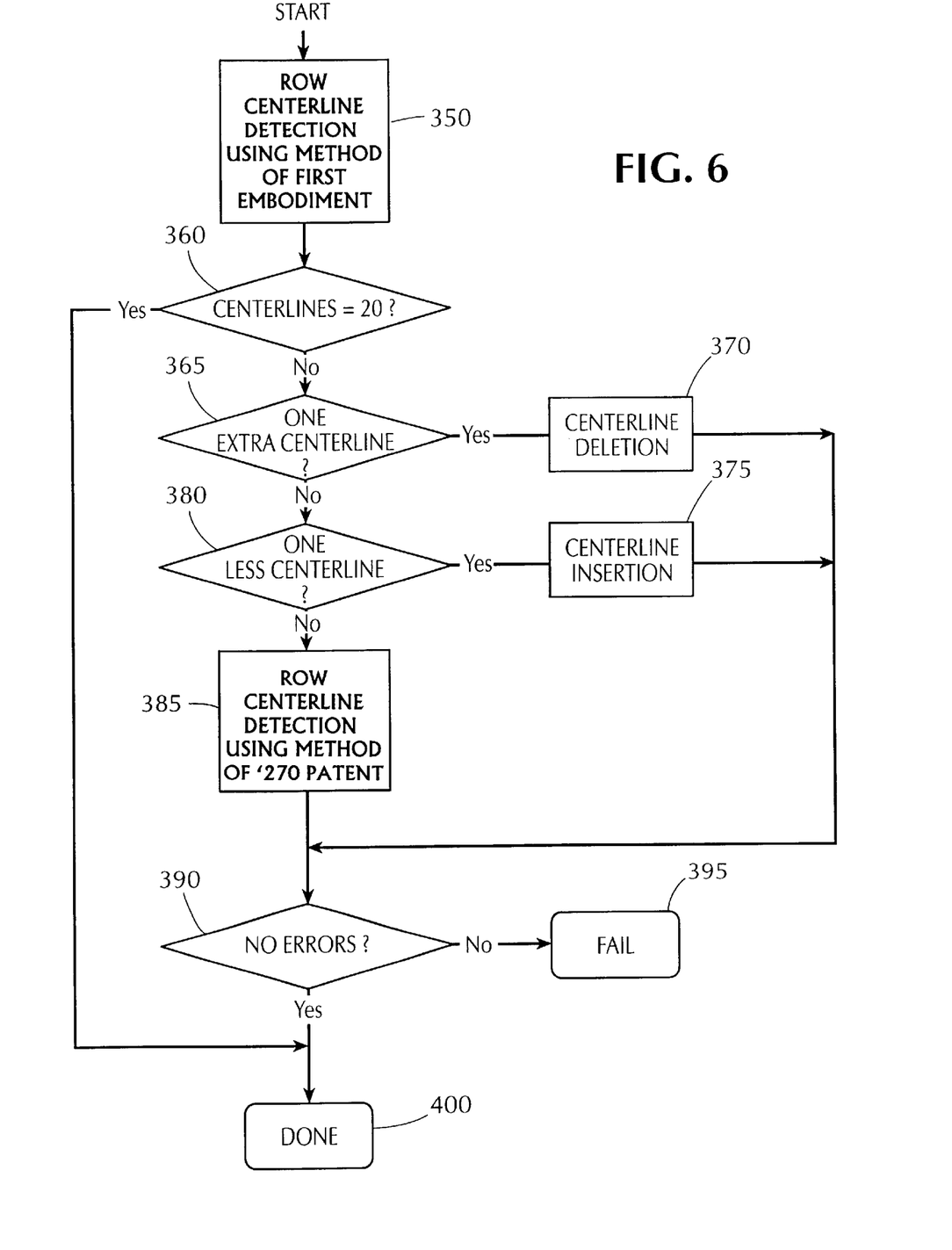
FIG. 6 is a flowchart showing how row centerlines are calculated in the second embodiment of the present invention.

Referring now to the flowchart of FIG. 6, since the line drop/line repeat distortion is much more likely to affect the rows of the two-dimensional barcode, the method of the first embodiment is first applied to the vertical edge array at step 350. If, at step 360, it is found that the method of the first embodiment produced the proper number of row centerlines, which is preferably 20, the read process is complete, as designated by step 400. However, if the number of row centerlines is incorrect, it is first determined whether there is one extra centerline (at step 365) or one less centerline (at step 380). If there is one extra centerline, processing proceeds to centerline deletion step 370, which is discussed in further detail below with respect to FIGS. 7A and 7B. If there is one less centerline, processing proceeds to centerline insertion step 375, which is discussed in further detail below with respect to FIG. 8. If there is more than one extra line or less than one less line, processing proceeds to step 385, where the method of the '270 Patent is used to process the vertical edge array. Upon completion of either the centerline deletion step 370, the centerline insertion step 375 or step 385, it is determined whether any errors were encountered in carrying out the chosen method at step 390. If no errors were encountered, the read process is complete, as designated by step 400. If errors were discovered, a failure is noted and processing stops, as designated by step 395.

Although the method of the second embodiment has been discussed with respect to one orientation of the two-dimensional barcode, as one reasonably skilled in the art will recognize, the method can be used to read two-dimensional barcodes which have line drop or line repeat distortion in the vertical direction, such as would occur in a document transmitted in 'landscape' mode instead of 'portrait' mode, by simply reversing the processing described in FIGS. 5 and 6 so that the FIG. 5 processing operates on the vertical edge array and the FIG. 6 processing operates on the horizontal edge array.

Since the method of the first embodiment does not propagate errors (meaning that only the centerlines for sections of the barcode which have distortion are affected by the distortion, and the centerlines for sections of the barcode which have no distortion will be properly located), if the number of centerlines located using that method differs by only one from the expected value (i.e., 19 or 21 in the preferred embodiment), it is possible to further process the vertical edge array to either add or delete an additional row centerline.

Figure 7A:
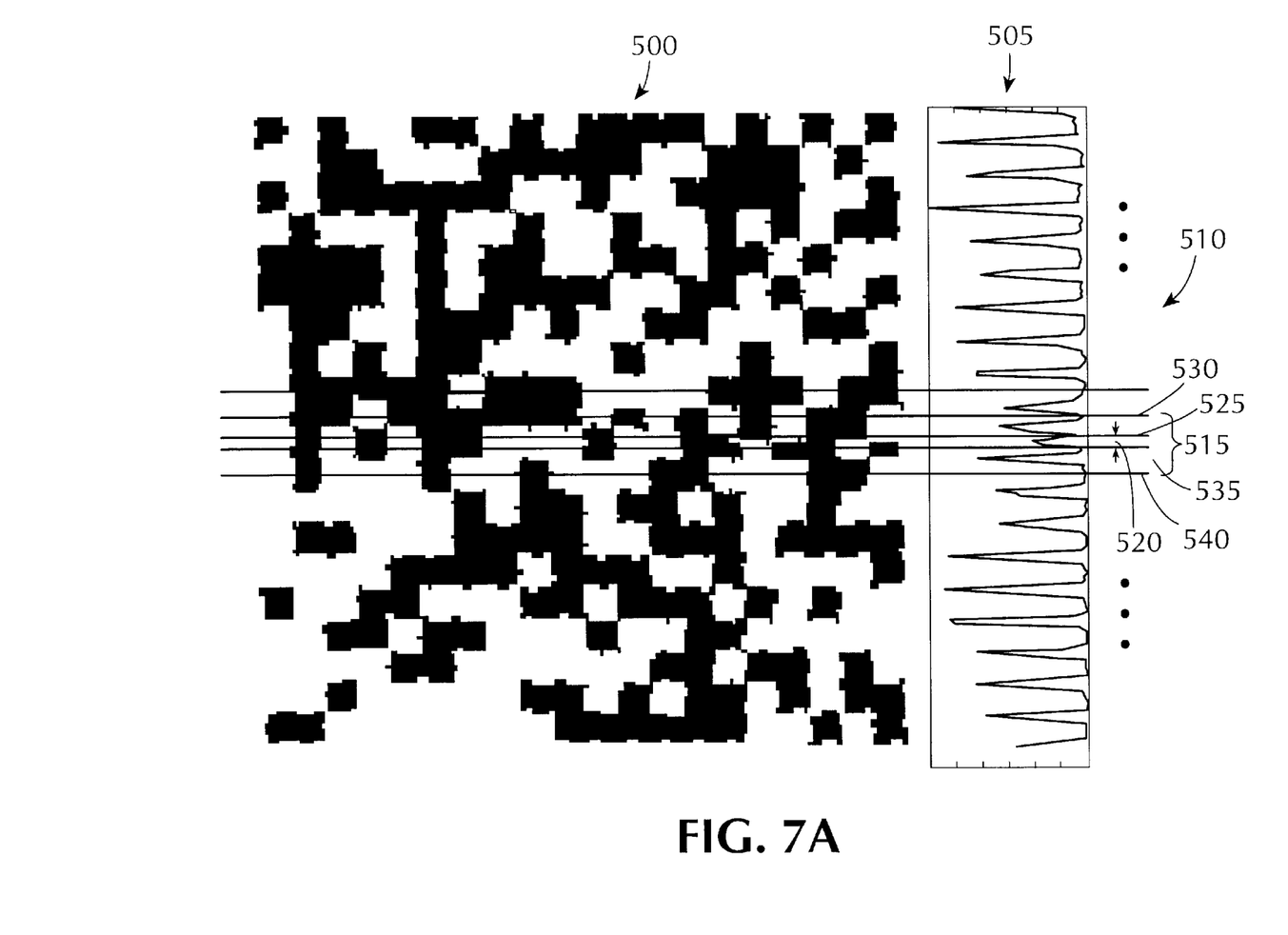
FIG. 7A shows a two-dimensional barcode having distortion and the resulting histogram of vertical edges and calculated centerlines for that barcode, including an extra centerline.
Figure 7B:
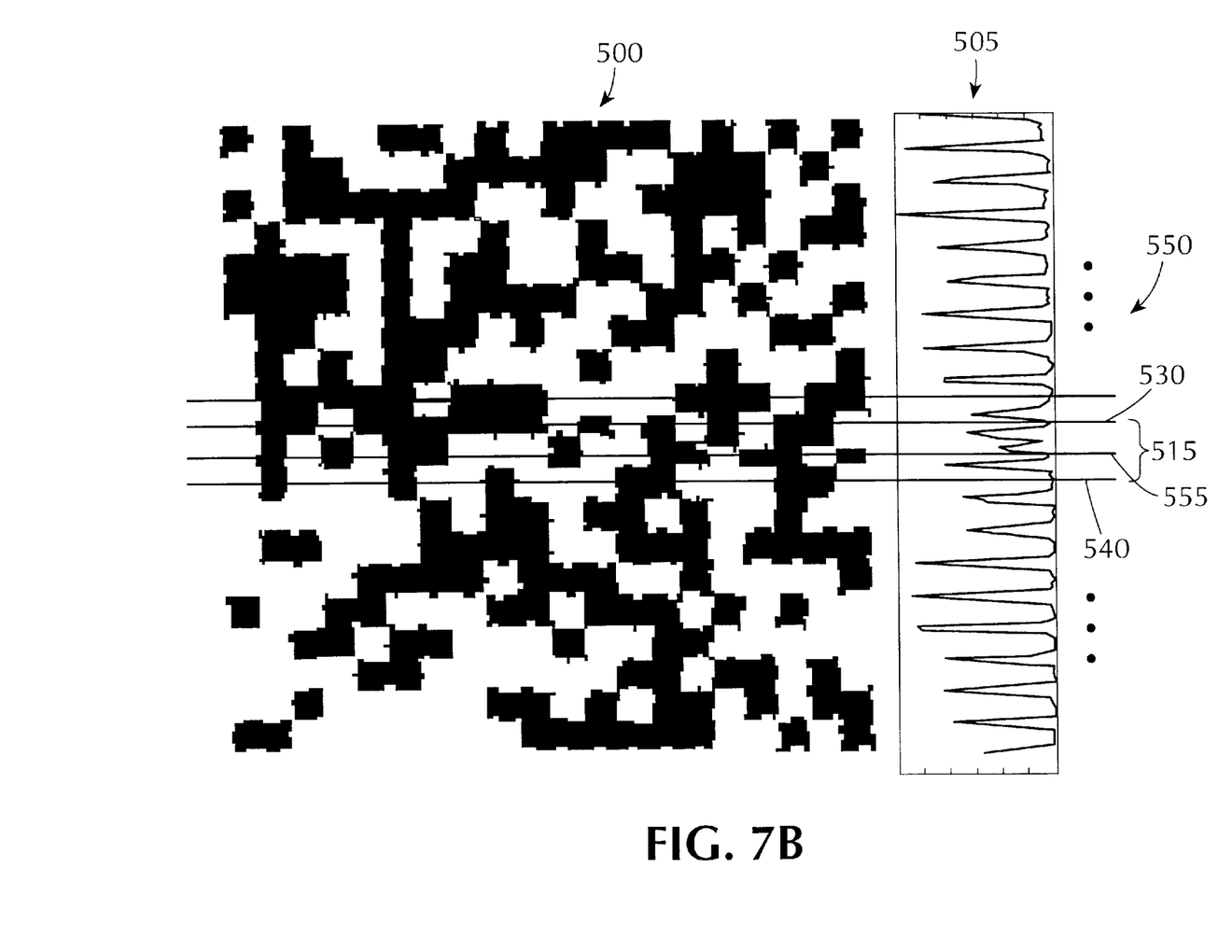
FIG. 7B shows a two-dimensional barcode having line drop distortion along with the resulting histogram of vertical edges and calculated centerlines for that barcode, after the extra centerline has been deleted in one aspect of the second embodiment of the present invention.

Referring now to the barcode 500 and associated histogram 505 of FIG. 7A, when one additional centerline is detected among the centerlines 510, there is most likely one "false" centerline. Without distortion, the located centerlines 510 are evenly separated among the edge histogram 505. Because of this, it is thus highly likely that the "false" centerline, e.g., centerline 525, is located between two true centerlines, e.g., centerlines 530 and 535. As a result, there is a narrower spacing between the "false" centerline 525 and the two surrounding centerlines 530 and 535. The "false" centerline 525 is identified by first locating the narrowest centerline spacing 520, and then establishing a deletion region 515 formed by the two centerlines, e.g., centerlines 530 and 540, adjacent to the centerlines having the narrowest spacing, i.e., centerlines 525 and 535. Thereafter, the deletion region 515 is reprocessed, by identifying the local minima therein (in the same manner as in the method of the '270 Patent) to locate a single centerline therein. FIG. 7B shows centerlines 550 which result after such processing in deletion region 515, including newly located centerline 555 between previously existing centerlines 530 and 540. Although the preferred method of this embodiment reprocessed entire the vertical edge array using the method of the '270 Patent when more than one extra centerline is found (see step 385 of FIG. 6), as one reasonably skilled in the art will recognize, the above methodology can be easily extended to locate more than one extra centerline for deletion by repeating the same process once the first centerline is deleted.

Figure 8:
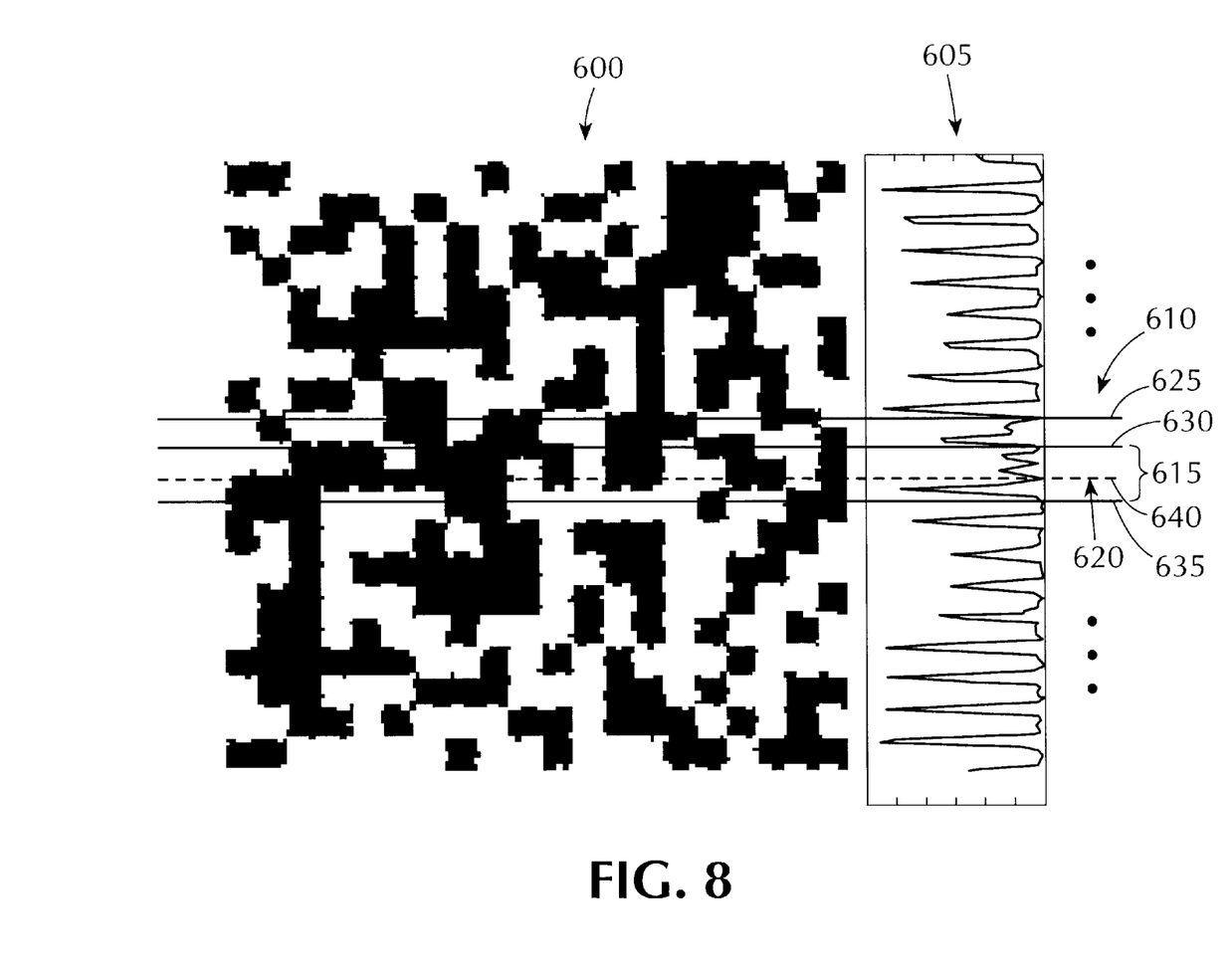
FIG. 8 shows a two-dimensional barcode having distortion, and the resulting histogram of vertical edges and calculated centerlines for that barcode showing how an extra centerline is inserted in another aspect of the second embodiment of the present invention.

Referring now to the barcode 600 and associated histogram 605 in FIG. 8, a similar situation to the centerline deletion step discussed above occurs when the number of centerlines 610 detected is one fewer than expected. Solid centerlines 625, 630 and 635 represent the centerlines actually detected in the relevant region of barcode 600. The region (e.g., region 615) where a missing centerline should fall is identified as being between the two centerlines (e.g., centerlines 630 and 635) which have the greatest separation there between. Once the insertion region 615 is identified, the centerline is located by identifying the local minima therein, in the same manner used in the method of the '270 Patent. The located centerline 640 is shown in dotted form in FIG. 8. Although the preferred method of this embodiment re-processes the vertical edge array using the method of the '270 Patent when more than one centerline is missing (see step 385 of FIG. 6), as one reasonably skilled in the art will recognize, the above methodology can easily be extended to locate more than one centerline by repeating the same process once the first centerline is inserted.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A method of decoding information stored in a two-dimensional barcode printed on a printed medium, comprising the steps of:

scanning a two-dimensional barcode to create a two-dimensional pixel array representing said two-dimensional barcode;

determining the horizontal edge count in each row of pixels in said two-dimensional pixel array;

determining the vertical edge count in each column of pixels in said two-dimensional pixel array;

determining the column centerlines by locating each successive pair of peaks in said horizontal edge counts, and then locating a column centerline in a valley region between each successive pair of peaks;

determining the row centerlines by locating each successive pair of peaks in said vertical edge counts, and then locating a row centerline in a valley region between each successive pair of peaks; and reading out binary data located at the intersection of each row centerline and column centerline to produce a signal representative of the encoded information in said two-dimensional barcode.

2. The method of claim 1, wherein each of said peaks in said horizontal edge counts has a magnitude greater than a predetermined peak threshold, and each of said peaks in said vertical edge counts has a magnitude greater than a predetermined peak threshold.

3. The method of claim 1, wherein each of said column centerlines has a magnitude less than a predetermined valley threshold, and each of said row centerlines has a magnitude less than a predetermined valley threshold.

4. The method of claim 1, wherein each of said successive pair of peaks in said horizontal edge counts is separated by at least a predetermined distance, and each of said successive pair of peaks in said vertical edge counts is separated by at least a predetermined distance.

5. The method of claim 2, wherein said step of determining the column centerlines includes a further step of reducing said predetermined peak threshold by a predetermined amount if a second peak within a pair of peaks in said horizontal edge counts is separated from a first peak by more than a predetermined distance, and then re-identifying said second peak using said reduced predetermined peak threshold, and said step of determining the row centerlines includes a further step of reducing said predetermined peak threshold by a predetermined amount if a second peak within a pair of peaks in said vertical edge counts is separated from a first peak by more than a predetermined distance, and then re-identifying said second peak using said reduced predetermined peak threshold.

6. A method of decoding information stored in a two-dimensional barcode printed on a printed medium, comprising the steps of:

scanning a two-dimensional barcode to create a two-dimensional pixel array representing said two-dimensional barcode;

determining the horizontal edge count in each row of pixels in said two-dimensional pixel array;

determining the vertical edge count in each column of pixels in said two-dimensional pixel array;

determining the column centerlines by locating each successive pair of peaks in said horizontal edge counts, each of said peaks having a magnitude greater than a predetermined peak threshold and each of said successive pair of peaks being separated by at least a predetermined distance, and then locating a column centerline in a valley region between each successive pair of peaks, each of said column centerlines having a magnitude less than a predetermined valley threshold;

determining the row centerlines by locating each successive pair of peaks in said vertical edge counts, each of said peaks having a magnitude greater than a predetermined peak threshold and each of said successive pair of peaks being separated by at least a predetermined distance, and then locating a row centerline in a valley region between each successive pair of peaks, each of said row centerlines having a magnitude less than a predetermined valley threshold; and reading out binary data located at the intersection of each row centerline and column centerline to produce a signal representative of the encoded information in said two-dimensional barcode.

7. A method of decoding information stored in a two-dimensional barcode printed on a printed medium, comprising the steps of:

scanning a two-dimensional barcode to create a two-dimensional pixel array representing said two-dimensional barcode;

determining the horizontal edge count in each row of pixels in said two-dimensional pixel array;

determining the vertical edge count in each column of pixels in said two-dimensional pixel array;

determining the column centerlines by the steps of
      locating the local minima representing the column centerlines in said horizontal edge counts, and comparing the number of column centerlines located to a predetermined number, or
      alternately, locating, if the number of column centerlines located is not equal to the predetermined number, the column centerlines by locating each successive pair of peaks in said horizontal edge counts, and then locating a column centerline in a valley region between each successive pair of peaks;

determining the row centerlines by the steps of
      locating each successive pair of peaks in said vertical edge counts, locating a row centerline in a valley region between each successive pair of peaks, and then comparing the number of row centerlines located to a predetermined number, or
      alternately, locating, if the number of row centerlines located is not equal to the predetermined number, the row centerlines by locating the local minima representing the row centerlines in said vertical edge counts;

reading out binary data located at the intersection of each row centerline and column centerline to produce a signal representative of the encoded information in said two-dimensional barcode.

8. The method of claim 7, wherein said step of determining the row centerlines further includes, instead of said alternate locating step, a step of locating and deleting an extra centerline upon detection that the number of row centerlines first located is one greater than the predetermined number.

9. The method of claim 7, wherein said step of determining the row centerlines further includes, instead of said alternate locating step, a step of inserting an extra centerline upon detection that the number of row centerlines first located is one less than the predetermined number.

10. The method of claim 7, wherein each of said peaks in said horizontal edge counts has a magnitude greater than a predetermined peak threshold, and each of said peaks in said vertical edge counts has a magnitude greater than a predetermined peak threshold.

11. The method of claim 7, wherein each of said column centerlines has a magnitude less than a predetermined valley threshold, and each of said row centerlines has a magnitude less than a predetermined valley threshold.

12. A method of decoding information stored in a two-dimensional barcode printed on a printed medium, comprising the steps of:

scanning a two-dimensional barcode to create a two-dimensional pixel array representing said two-dimensional barcode;

determining the horizontal edge count in each row of pixels in said two-dimensional pixel array;

determining the vertical edge count in each column of pixels in said two-dimensional pixel array;

determining the row centerlines by the steps of
      locating the local minima representing the row centerlines in said vertical edge counts, and comparing the number of row centerlines located to a predetermined number, or
      alternately, locating, if the number of row centerlines located is not equal to the predetermined number, the row centerlines by locating each successive pair of peaks in said vertical edge counts, and then locating a row centerline in a valley region between each successive pair of peaks;

determining the column centerlines by the steps of locating each successive pair of peaks in said horizontal edge counts, locating a column centerline in a valley region between each successive pair of peaks, and then comparing the number of column centerlines located to a predetermined number, or alternately, locating, if the number of column centerlines located is not equal to the predetermined number, the column centerlines by locating the local minima representing the column centerlines in said horizontal edge counts;

reading out binary data located at the intersection of each row centerline and column centerline to produce a signal representative of the encoded information in said two-dimensional barcode.

13. The method of claim 12, wherein said step of determining the column centerlines further includes, instead of said alternate locating step, a step of locating and deleting an extra centerline upon detection that the number of column centerlines first located is one greater than the predetermined number.

14. The method of claim 12, wherein said step of determining the column centerlines further includes, instead of said alternate locating step, a step of inserting an extra centerline upon detection that the number of column centerlines first located is one less than the predetermined number.

15. The method of claim 12, wherein each of said peaks in said vertical edge counts has a magnitude greater than a predetermined peak threshold, and each of said peaks in said horizontal edge counts has a magnitude greater than a predetermined peak threshold.

16. The method of claim 12, wherein each of said row centerlines has a magnitude less than a predetermined valley threshold, and each of said column centerlines has a magnitude less than a predetermined valley threshold.

* * * * *